C. J. MARKS.
GEAR TRUING CHUCK.
APPLICATION FILED NOV. 26, 1913.
1,110,396.
Patented Sept. 15, 1914.
2 SHEETS—SHEET 1.
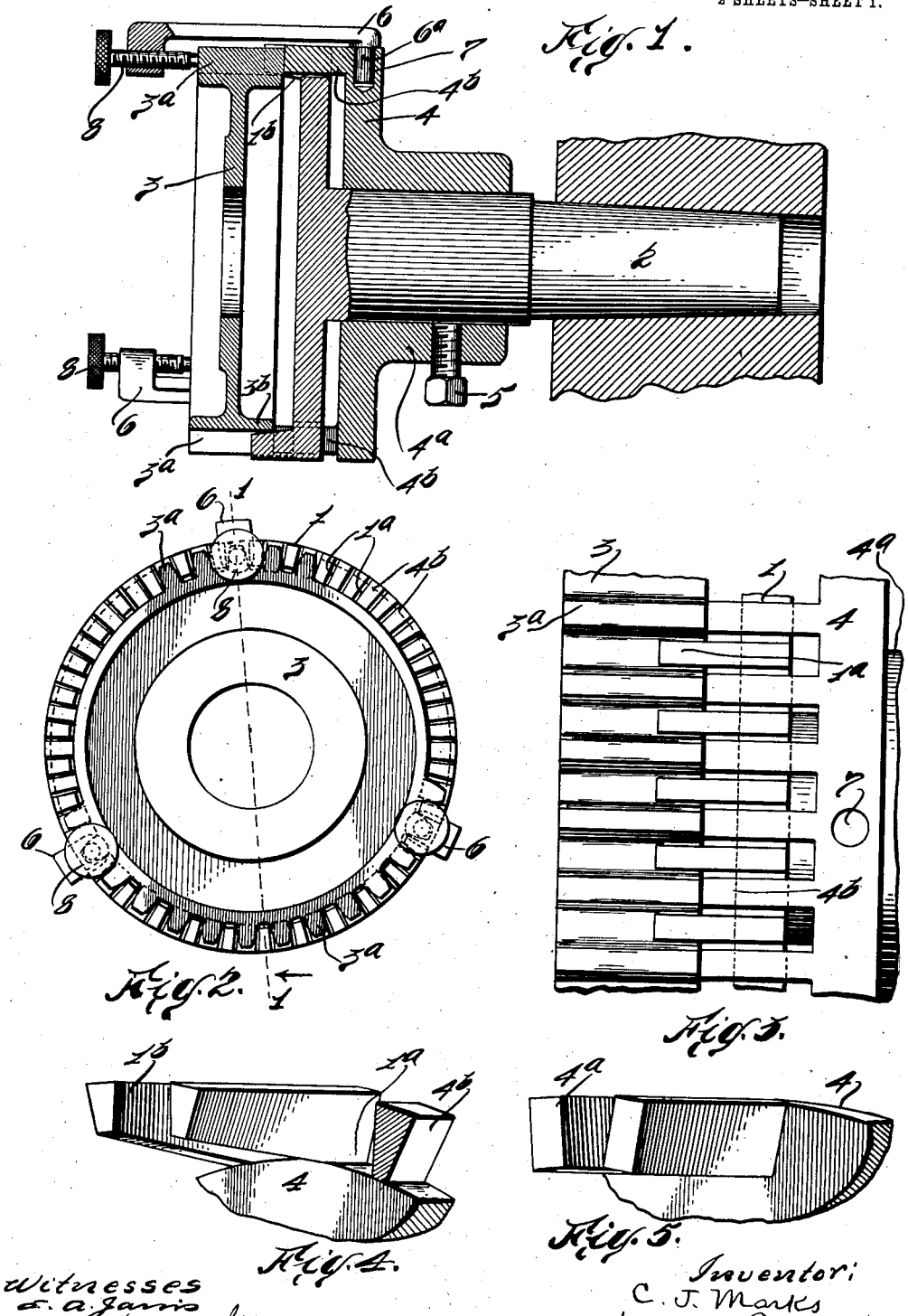
Witnesses
Inventor:
C. J. Marks C. J. MARKS.
GEAR TRUING CHUCK.
APPLICATION FILED NOV. 26, 1913.
1,110,396.
Patented Sept. 15, 1914.
2 SHEETS—SHEET 2.
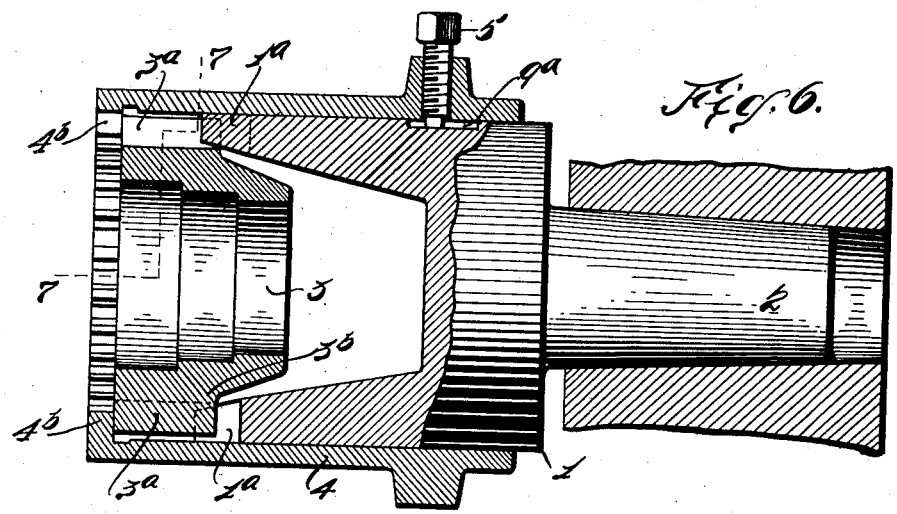
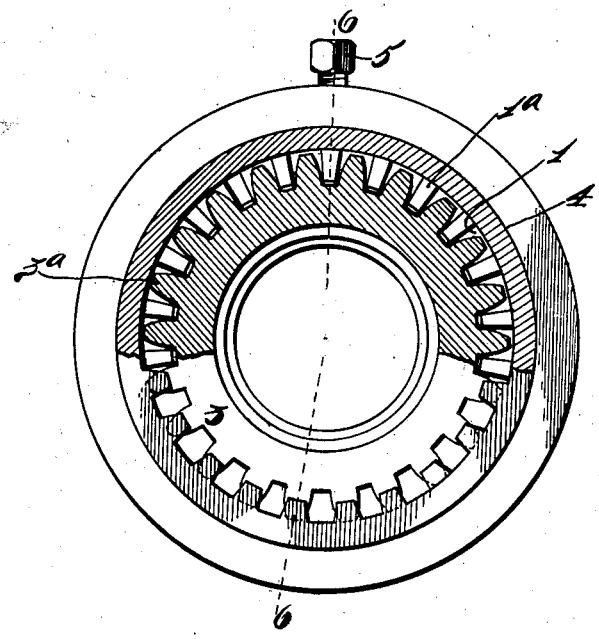
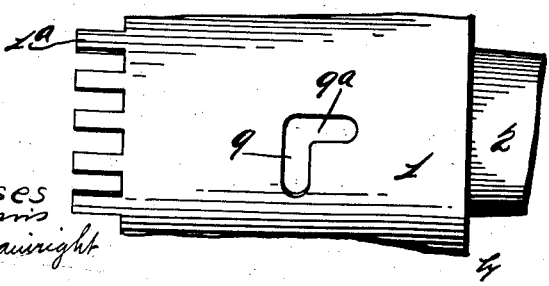
Witnesses
C. A. Jarvis
Marie F. Wainright
Inventor:
C. J. Marks
T. F. Bourne
attorney.

UNITED STATES PATENT OFFICE.

CHARLES J. MARKS, OF NEW BRUNSWICK, NEW JERSEY.

GEAR-TRUING CHUCK.

1,110,396.  Specification of Letters Patent.  Patented Sept. 15, 1914.

Applcaition filed November 26, 1913. Serial No. 803,097.

*To all whom it may concern:*

Be it known that I, CHARLES J. MARKS, a citizen of the United States, and resident of New Brunswick, in the county of Middlesex and State of New Jersey, have invented certain new and useful Improvements in Gear-Truing Chucks, of which the following is a specification.

The object of my invention is to provide a simple and efficient chuck wherein gears may be properly centered and held to enable the holes or bores in the gears, as well as the faces of the gears, to be properly ground or turned with respect to the axis as well as to the teeth of the gears.

My invention comprises novel details of improvement and combinations of parts that will be more fully hereinafter set forth and then pointed out in the claims.

Reference is to be had to the accompanying drawings forming part hereof, wherein—

Figure 1 is a central sectional view of my improved chuck; Fig. 2 is a face view thereof, part of the teeth of the gear being removed; Fig. 3 is a detail edge view, enlarged, of Fig. 1; Fig. 4 is a fragmentary view of portions of the inner and outer members of the chuck; Fig. 5 is a similar view of the inner member of the chuck; Fig. 6 is a view similar to Fig. 1, partly on the line 6, 6, in Fig. 7, illustrating a modification; Fig. 7 is an end view, partly in section on the line 7, 7, in Fig. 6, and Fig. 8 is a detail plan view of part of the inner member of Fig. 6.

Similar numerals of reference indicate corresponding parts in the several views.

The numeral 1 indicates an inner member shown provided with a tapering spindle 2, adapted to fit the nose of the spindle of a grinding machine or lathe, in any well-known manner. Member 1 is provided with a plurality of teeth $1^a$ adapted to fit between the teeth $3^a$ of a gear 3 to be ground or turned, the diametrical distance between the inner surfaces of teeth $1^a$ being such that said surfaces may bear upon the material of the gear at the bottom of its teeth, as illustrated in Figs. 1 and 6, at the rim or solid portion $3^b$ of the gear. By preference, the inner surface $1^b$ of teeth $1^a$ are flaring or tapering outwardly to allow for variations and distortions in the diameters of gears which take place when they are hardened. At 4 is an outer member, disposed concentrically to member 1, and shown provided with a hub or extension $4^a$ slidably fitted upon member 1, or its extension or spindle portion 2. Member 4 is shown provided with a set screw 5 for securing the parts 1 and 4 together in set positions. The member 4 is provided with teeth $4^b$ properly spaced apart to fit against the face of the teeth $3^a$ of the gear 3 when the teeth $1^a$ of member 1 are between said gear teeth. In Figs. 1 to 5 the teeth $4^b$ fit between the teeth $1^a$ of member 1. It will be seen that the teeth $1^a$ and $4^b$ are disposed substantially parallel to the axis of their corresponding members 1 and 4, whereby when gear 3 is placed in position with the teeth $1^a$ between its gear teeth, and teeth $4^b$ against the faces of said gear teeth, the gear will be properly alined with respect to the axis of spindle 2, regardless of how the teeth $3^a$ may have been cut, or may have become distorted with respect to the pitch line, during the hardening process thereof, since the position of gear 3 and the chuck is determined in a radial direction by the engagement of teeth $1^a$ with the solid portion $3^b$ of the gear, while the position of gear 3 in a direction transverse to its axis, and to the axis of spindle 2 is determined by the gear teeth $3^a$ bearing against the ends of teeth $4^b$. To retain the gear 3 in proper relation to the members 1 and 4, in accordance with Figs. 1 and 5, I provide a plurality of clamps 6 shown having projection $6^a$ adapted to enter the corresponding sockets 7 in member 4, and extending forwardly outside of gear 3, set screws 8 being provided at the ends of said clamps adapted to bear against gear 3 or its teeth, whereby the gear is retained set in firm position against teeth $4^b$ of member 4, with the teeth $1^a$ of member 1 between the teeth of the gear.

To adjust a gear to the chuck of Figs. 1 and 5, the clamps 6 may be removed or swung aside, the gear is placed against member 1 with the teeth $1^a$ between the teeth of the gear, thereby determining the position of the gear with respect to the axis of spindle 2; member 4 is set with its teeth $4^b$ against the teeth $3^a$ to cause the gear to assume the proper position transversely to the axis of spindle 2, clamps 6 are then placed in position, and the set screws 8 are forced against the gear or its teeth to retain the parts in such position. During rotation of the chuck with the gear the latter will be rotated by engagement of the teeth 1ª with the teeth of the gear.

In Fig. 6 the member 4 is shown in sleeve-like form, with its teeth 4ᵇ bearing upon the sides of the teeth of the gear opposite to the side of the gear where the teeth 1ª of inner member 1 engages the solid portion of the gear and enter between the teeth of the latter, whereby, when member 4 is fastened to member 1 by the set screw 5, the gear 3 will be secured in proper position for rotation of the gear. In order that gear 3 may be inserted in the chuck without requiring member 4 to be removed therefrom, I have shown member 1 provided with an angularly disposed slot 9 (Fig. 8), adapted to receive the end of set screw 5, and so disposed that member 4 may be drawn forwardly with the set screw passing through the longitudinal leg 9ª of the slot, and member 4 may then be rotated upon member 1 to bring the teeth 4ᵇ into alinement with teeth 1ª to permit teeth 3ª of the gear to pass between teeth 4ᵇ and 1ª to bring the solid part of the gear into engagement with the inner surface of the teeth 1ª, and then member 4 may be reversely rotated to bring its teeth 4ᵇ in front of the teeth 3ª and may be pushed back against the latter, the screw 5 again passing through the leg 9ª of slot 9, and said screw may then be set to hold members 1 and 4 firmly with the gear clamped securely therebetween.

In accordance with my invention chucks may be provided adapted to receive spur or helical gears of any desired shapes or sizes, and such gears will be accurately held with relation to their axes so that the holes or bores in the gears may be accurately and automatically trued, ground or bored, without requiring particular skill on the part of the operator in setting the gears in the chuck, thereby saving time and expense in grinding or boring holes or bores in gears, with more perfect results than where gears are held by their teeth for grinding or boring their bores, since inequalities are liable to occur due to the distortion of the teeth of the gears that may occur during the hardening process.

Changes may be made in the details of construction and arrangements of parts shown and described, within the scope of the appended claims, without departing from the spirit of the invention.

Having now described my invention what I claim is:—

1. A chuck comprising a plurality of members, one of said members having teeth to receive the teeth of a gear, the other member having means to bear against the gear; and means for retaining said gear securely upon said members.

2. A chuck comprising a pair of members concentrically disposed, one of said members having teeth disposed relatively to the teeth of a gear, the other member having teeth adapted to bear against the teeth of the gear, and means to retain the gear securely in said members.

3. A chuck comprising a pair of members concentrically disposed, one of said members having teeth disposed relatively to the teeth of a gear, said teeth on their inner surfaces being outwardly tapered to bear upon the solid portion of the gear, the other member having teeth adapted to bear against the teeth of the gear, and means to retain the gear securely in set position.

4. A chuck comprising a plurality of members concentrically disposed, one of said members having teeth adapted to pass between teeth of a gear, the other member having teeth disposed between teeth of the first named member and adapted to bear against the opposed face of the gear, and means to retain said gear upon said members.

5. A chuck comprising a plurality of members concentrically disposed, one of said members having teeth adapted to pass between teeth of a gear, the other member having teeth disposed between teeth of the first named member and adapted to bear against the opposed face of the gear, means to secure said members together, and clamping means carried by one of the members to retain the gear in the chuck.

6. A chuck comprising a plurality of members concentrically disposed, one of said members having teeth adapted to pass between teeth of a gear, the other member having teeth disposed between teeth of the first named member and adapted to bear against the opposed face of the gear, means to secure said members together, one of said members having clamps provided with means to retain the gear pressed against the teeth of said member.

7. A chuck comprising a plurality of members concentrically disposed, one of said members having teeth adapted to pass between teeth of a gear, the other member having teeth disposed between teeth of the first named member and adapted to bear against the opposed face of the gear, means to secure said members together, one of said members having clamps provided with screws at their outer parts to bear against the gear to retain it pressed against the teeth of said member.

8. A chuck comprising a pair of members, one of said members being mounted to slide upon the other member, one of said members having teeth adapted to pass between the teeth of a gear and to bear against the solid portion of the latter, the other member having teeth interposed between the teeth of the first named member and adapted to bear against the gear, said member having clamps extending forwardly without the gear and provided with screws to press the gear toward the teeth of said member.

9. A chuck comprising a pair of members, one of said members being mounted to slide upon the other member, one of said members having teeth adapted to pass between the teeth of a gear and to bear against the solid portion of the latter, the other member having teeth interposed between the teeth of the first named member and adapted to bear against the gear, clamps movably carried by said member, means to cause said clamps to press the gear against the teeth of said member, and means to secure said members together.

10. A chuck comprising a plurality of members concentrically disposed, one member being slidable along the other member, means to secure said members together in set positions, one of said members having teeth adapted to pass between the teeth of a gear, the other member having teeth adapted to engage the face of the gear, and means to retain the gear clamped against said teeth.

Signed at New York city, in the county of New York and State of New York, this 25th day of November, A. D. 1913.

CHARLES J. MARKS.

Witnesses:
MARIE F. WAINRIGHT,
T. F. BOURNE.